Nov. 25, 1924.
F. H. LE VALLEY
HOG GREASER
Filed Aug. 9, 1923
1,516,861
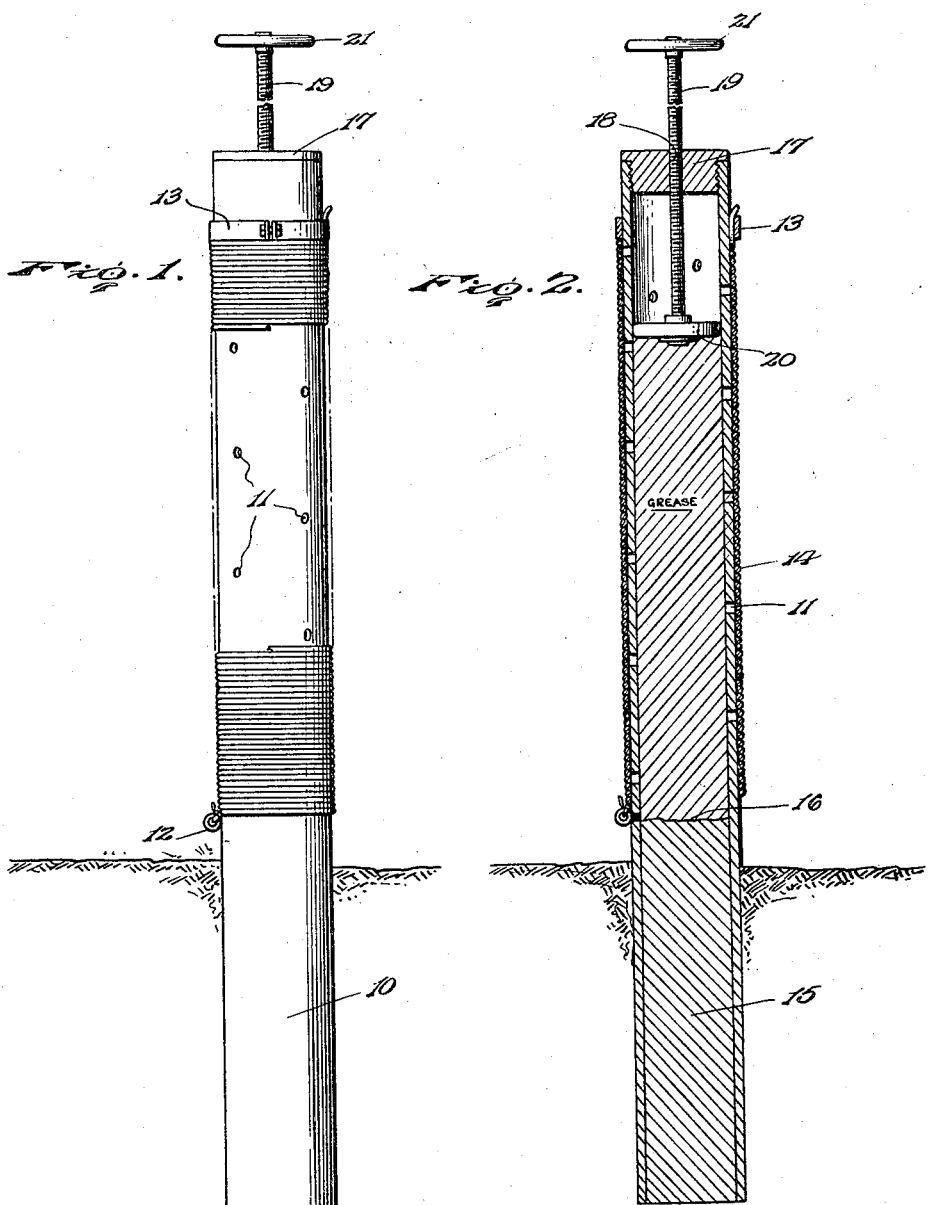
Inventor
F. H. Le Valley.
By Lacy Lacy, Attorneys Patented Nov. 25, 1924.

1,516,861

UNITED STATES PATENT OFFICE.

FRED H. LE VALLEY, OF HURON, SOUTH DAKOTA.

HOG GREASER.

Application filed August 9, 1923. Serial No. 656,541.

*To all whom it may concern:*

Be it known that I, FRED H. LE VALLEY, a citizen of the United States, residing at Huron, in the county of Beadle and State of South Dakota, have invented certain new and useful Improvements in Hog Greasers, of which the following is a specification.

The present invention relates to a device for lubricating the hide of hogs.

It is a well known fact that the hide of hogs readily dries and cracks, particularly in hot weather, which causes the animal pain and itching, and in order to relieve such pain, this device is provided so that the animal may rub the lubricant into his skin whenever he feels the necessity.

In the accompanying drawing, one embodiment of the invention is illustrated; and—

Figure 1 shows an elevation of the hog greaser forming the subject matter of the present invention; and Figure 2 is a vertical section thereof.

In the drawing, reference numeral 10 represents a piece of pipe driven into the ground a sufficient distance to firmly hold it therein. A suitable size for this pipe is between five and six feet in length, of which all but three feet is driven into the ground. The pipe is preferably a wrought iron pipe of four-inch diameter, which is provided with a plurality of perforations 11 in the part of the pipe situated above the ground. These perforations are suitably made one-eighth of an inch in diameter.

Near the ground, the pipe is provided with an eye-bolt 12 to which is attached one end of a preferably one-inch rope 14 which is wound around the exposed part of the pipe covering the apertures and to within a couple of inches from the top end of the pipe. At this place is furnished a clamping band 13 which firmly secures the upper end of the rope to the pipe so that the animal rubbing against the rope cannot uncoil the same.

The lower end of the pipe, below the ground line and approximately three inches above the same, is filled with concrete 15, thereby providing a bottom 16 in the upper hollow portion of the pipe.

The top opening of the pipe is closed by means of a plug 17 threaded therein and this plug is provided with a central opening 18 threaded correspondingly to receive a threaded rod 19, to the lower end of which is attached a plunger or piston 20. At the upper end of the rod 19 is a small hand wheel 21. It will now be readily understood that by turning the hand wheel 21, the threaded rod 19 will pass up and down in the upper portion of the pipe 10, thereby pressing grease carried in the pipe and squeezing some of it through the apertures 11. To fill the pipe with lubricant, the plug 17 is unscrewed and removed together with the rod 19 and the plunger 20 from the pipe 10. The rod 19 has a sufficient length to permit the plunger piston 20 to reach the bottom 16 before the hand wheel 21 touches the plug 17, so that all the grease may be squeezed out of the apertures 11.

When the grease is forced out through the apertures 11, it will squeeze between the coils of the rope 14 and keep the same lubricated, so that whenever the animal comes up to rub himself against the post, its skin will be lubricated sufficiently to keep it from itching and to gradually heal up any cracks that might have formed therein.

Having thus described the invention, what is claimed as new is:

A hog greaser comprising a pipe having its lower end adapted to be embedded in the ground and provided with a plurality of perforations uniformly distributed through its side wall from a point near its lower end to approximately the top of the pipe, anchoring material filling the lower end of the pipe to approximately the level of the lowest perforation and forming a support for a lubricant placed in the pipe, a rope coiled around the pipe and covering substantially all of the perforations therein, means for securing the ends of the rope against the pipe, and means for forcing the lubricant from the pipe through the perforations therein and between the coils of the rope.

In testimony whereof I affix my signature.

FRED H. LE VALLEY. [L. S.]